United States Patent [19]

Anderson et al.

[11] 3,905,927

[45] Sept. 16, 1975

[54] DUSTLESS FREE-FLOWING LEAD STABILIZER COMPOSITIONS FOR POLYVINYL CHLORIDE

[75] Inventors: Robert Frederick Anderson, Flemington, N.J.; Bojan Terzic, Lombard, Ill.

[73] Assignee: American Cyanamid Company, Stamford, Conn.

[22] Filed: June 21, 1973

[21] Appl. No.: 372,123

[52] U.S. Cl. ............. 260/23 XA; 252/410; 252/404
[51] Int. Cl.$^2$ .................. C08L 91/00; C08F 19/14
[58] Field of Search......... 260/23 XA; 252/400, 404

[56] References Cited
UNITED STATES PATENTS

| | | | |
|---|---|---|---|
| 2,625,521 | 1/1953 | Fischer | 260/23 XA |
| 3,168,480 | 2/1965 | Worrell | 252/404 |
| 3,562,180 | 2/1971 | White | 252/400 |
| 3,645,944 | 2/1972 | White | 260/23 XA |

Primary Examiner—Donald E. Czaja
Assistant Examiner—William E. Park
Attorney, Agent, or Firm—Philip Mintz

[57] ABSTRACT

Dustless free-flowing lead stabilizing compositions for use in polyvinyl chloride are disclosed which comprise an intimate mixture of a major proportion of lead stabilizer compound, a minor proportion of polyvinyl chloride resin, a small proportion of plasticizer, and a small proportion of organic lubricant.

6 Claims, No Drawings

DUSTLESS FREE-FLOWING LEAD STABILIZER COMPOSITIONS FOR POLYVINYL CHLORIDE

This invention relates to improved dustless freeflowing lead stabilizing compositions for use in polyvinyl chloride, and more particularly, to dustless free-flowing polyvinyl chloride masterbatch compositions for easy incorporation in polyvinyl chloride to be stabilized by lead stabilizing compounds.

As is well known, polyvinyl chloride resins are subject to degradation on exposure to heat, such as is commonly encountered in commercial molding processes for shaping such resins into useful articles. It is also well known to stabilize such resins by incorporating therein lead stabilizing compounds, some of which, such as the basic lead salts of organic and inorganic acids, are in wide-spread commercial use. These lead stabilizing compounds tend to be dusty as well as being toxic, leading to difficulties in incorporating them into the polyvinyl chloride resins due to the resultant toxic contamination of the working area creating a serious hazard for workers.

The value of these lead stabilizing compounds in polyvinyl chloride resins is so great that they are widely used despite these serious problems. Various attempts have been made in the past to overcome these difficulties, but such have not been completely successful and difficulties are still present. In those instances where the dustiness problem has been overcome by using modified lead stabilizing compound formulations, other difficulties have been created in that such formulations may be sticky and cake instead of flowing freely, may be difficult to handle requiring specialized handling equipment, may be difficult to incorporate in the polyvinyl chloride resin uniformly due to problems in mixing or obtaining fine dispersions, etc.

One attempt to overcome the dustiness problem comprises treating the lead stabilizing compound with small amounts of mineral oil or plasticizer to form a lumpy or paste-like material. While the dustiness problem may be solved by this means, the products are sticky and not free-flowing and tend to cake. This makes the material difficult to handle and difficult to blend uniformly into the polyvinyl chloride resins.

A further attempt to overcome these problems comprises making flakes, pellets, or granules from mixtures of the lead stabilizing compounds with higher fatty acids or salts thereof, waxes, binders, etc. In addition to adding to the manufacturing cost, use of such comminuted mixtures frequently requires modification of the polyvinyl chloride resin compounding processes and compositions to compensate for the presence of the extra addends incorporated with the desired lead stabilizing compounds in the mixtures thereof. Also, the larger particle size and greater hardness of these flakes, pellets, or granules often makes difficult uniform incorporation thereof into the polyvinyl chloride resin by conventional ribbon-blending techniques.

Thus, while the dustiness problem has been overcome in some instances, this has been achieved only at the expense of introducing other problems into the technology of incorporating lead stabilizing compounds into polyvinyl chloride resins.

It is an object of the present invention to provide compositions useful for incorporating lead stabilizing compounds into polyvinyl chloride resins. It is a further object to do so in such a fashion that the dustiness problem is overcome without introducing any of the problems described above which the previous attempts to alleviate the dustiness problem introduced. It is a particular object of the present invention to provide an improved composition containing a lead stabilizing compound which is dustless, free-flowing, and non-sticking or non-caking which can easily be uniformly blended with polyvinyl chloride resins using conventional blending equipment without introducing extraneous materials into the finished products.

In accordance with the present invention, these objects, and other objects which will become apparent from the present description, are achieved by the use of a masterbatch composition which comprises an intimate mixture of (a) a major proportion of the lead stabilizer compound, (b) a minor proportion of a polyvinyl chloride resin, (c) a small proportion of a conventional plasticizer, and (d) a small proportion of a conventional organic lubricant. Useful proportions of these four ingredients in the intimate mixture thereof are (a) 60 to 90% by weight of the lead stabilizer compound, (b) 5 to 35% by weight of the polyvinyl chloride resin, (c) 0.1 to 20% by weight of the plasticizer, and (d) 0.5 to 15% by weight of the lubricant. A practical and preferred range of the proportions of the four ingredients is (a) 75 to 85% weight of lead stabilizing compound, (b) 10 to 20% by weight of polyvinyl chloride resin, (c) 2 to 15% by weight of plasticizer, and (d) 1 to 3 % by weight of lubricant.

The lead stabilizing compounds, usable as the major component of the compositions of the present invention, are those compounds of lead useful for stabilizing polyvinyl chloride resins against degradation. Of the lead stabilizing compounds known for this purpose, the preferred ones are the basic lead salts of inorganic acids, although others are known and useful. Illustrative of these lead stabilizing compounds are the basic lead sulfates, basic lead carbonates, basic lead phosphites, basic lead silicates, basic lead phosphates, basic lead sulfophosphites, basic lead phthalates, basic lead sulfophthalates, and mixtures and complex intercompounds thereof.

The polyvinyl chloride resin, usable as a minor component of the compositions of the present invention, comprise homopolymers of vinyl chloride as well as copolymers of predominantly vinyl chloride with monoethylenically unsaturated monomers copolymerizable therewith, such as vinyl acetate, lower alkyl acrylates and methacrylates, acrylonitrile, vinylidene chloride, dibutyl maleate, diethyl fumarate, etc. Preferably, but not necessarily, the polyvinyl chloride resin used in the compositions of the present invention is the same as or very similar to the polyvinyl chloride resin into which this masterbatch composition is to be blended.

The plasticizer which is the third component of the compositions of the present invention is a conventional plasticizer for polyvinyl chloride resins, including the phthalates, sebacates, trimellitates, and phosphates, such as dioctyl phthalate, dibutyl phthalate, diisodecyl phthalate, nonyldecyl phthalate, trioctyl trimellitate, dicyclohexyl phthalate, tricresyl phosphate, triethyl phosphate, dibutyl sebacate, dioctylsebacate, etc. Especially preferred are those in widespread commercial use as plasticizers for polyvinyl chloride resins.

The lubricant which is the fourth component of the compositions of the present invention is a conventional lubricant for polyvinyl chloride resins, such as the higher fatty acids of about 8 to about 22 carbon atoms and the calcium, barium, strontium, magnesium, zinc, lead, lithium, cadmium, or aluminum salts thereof, such as calcium stearate, magnesium stearate, stearic acid, lauric acid, barium stearate, calcium laurate, zinc stearate, etc. or natural or synthetic waxes and wax-like materials such as spermaceti wax, paraffin wax, carnuba wax, Acrawax C, castor wax, etc. Especially preferred are those in widespread commercial use as lubricants in polyvinyl chloride resins.

The compositions of the present invention may be prepared by simply mixing together thoroughly the various components. They may be mixed together using any suitable mixing apparatus such as a sigma-blade mixer, a coffee blender, or a ribbon blender. In some instances, it may be desirable to preheat some of the components. Within the ranges of proportions of ingredients given above, it may be desirable to utilize such proportions that the masterbatch of this invention supplies the lead stabilizing compound, the plasticizer, and the lubricant to the resin being compounded in the proper proportions for the further processing and end uses thereof.

This invention and some of its advantages over previous formulations are illustrated by the following examples wherein all parts are by weight. In these examples various formulations were prepared by mixing together the indicated ingredients in the indicated proportions using a Brabender Sigma Blade Mixer unless otherwise indicated and were tested for dustiness, stickiness, and flowability by the following procedures.

Dustiness was evaluated by shaking the formulation in a closed container, removing the cap, and noting the dust. The dustiness was rated on a scale of 1 to 10 wherein a 10 rating indicated extreme dustiness and a 1 rating indicated complete lack of dustiness.

Stickiness was evaluated by shaking the formulation in a closed glass container and noting the heaviness of deposit on the container walls thereafter. The stickiness was rated on a scale of 1 to 10 wherein a 10 rating indicated extreme stickiness and 1 indicated a complete lack of stickiness or absence of caking.

Flowability was evaluated by tipping a closed glass container containing the formulation and noting the freedom of product movement as compared with unmodified stabilizer standard. The results are reported as unimproved (U), improved (I), or much improved (MI).

EXAMPLES 1-20

The following formulations were prepared in a Brabender Sigma Blade Mixer using tribasic lead sulfate as illustrative of the lead stabilizing compounds unless otherwise indicated and were tested as described above for dustiness, stickiness, and flowability. The data obtained is in the following table showing compositions of the present invention and comparisons with compositions outside the scope of the present invention.

TABLE

| Example No. | Components — Parts by Weight | | | | Remarks | Dustiness | Stickiness | Flowability |
|---|---|---|---|---|---|---|---|---|
| | PVC | Lead Stabilizer | Plasticizer | Lubricant | | | | |
| 1. | 15 | 80 | None | None | Two components mixed | 10 | 4 | U |
| 2. | 15 | 80 | None | 2 Ca stearate | Ca stearate mixed in last | 10 | 4 | U |
| 3. | 15 | 76 | 9 DOP (1) | None | Resin preheated to 83°C. DOP preheated to 115°C., stabilizer mixed in last | 1 | 5 | I |
| 4. | 15 | 76 | 9 DOP | None | Same as 3 but DOP not preheated | 1 | 5 | I |
| 5. | 15 | 76 | 9 DOP | 0.5 was (2) | Same as 4 but lubricant added last | 1 | 4 | I |
| 6. | 15 | 80 | 5 DOP | None | No preheating-stabilizer mixed in last | 1 | 5 | I |
| 7. | 15 | 80 | 5 DOP | 1 Ca stearate | Same as No. 6-Ca Stearate mixed in last | 1 | 4 | I |
| 8. | 15 | 80 | 5 DOP | 1 Ca stearate | Same as No. 7 but Ca Stearate added last | 1 | 3 | MI |
| 9. | 15 | 80 | 5 DOP | 3 Ca stearate | Same as No. 7 but Ca Stearate added last | 1 | 2 | MI |
| 10. | 15 | 76 | 9 DOP | 0.5 Lauric Acid (3) | Same as No. 3, lubricant added last | 1 | 5 | I |
| 11. | 15 | 80 | 5 DOP | None | DOP preheated to 115°C. Resin not heated; stabilizer added last | 1 | 5 | I |
| 12. | 15 | 76 (4) | 9 DOP | None | Resin preheated to 83°C. Plasticizer to 115°C. Stabilizer added last | 1 | 5 | I |
| 13. | 16.1 | 72.5 | 9.8 (5) | 1.6 Lauric Acid | Resin & Plasticizer mixed first, the stabilizer finally lubricant (6) | 2 | 1 | MI |
| 14. | 15 | 80 | 5 DOP | None | Stabilizer added last (7) | 1 | 5 | I |
| 15. | 15 | 80 | 5 DOP | 1 Ca Stearate | Same as No. 14 but added Ca stearate last | 1 | 2 | MI |
| 16. | 15 | 80 | 5 DOP | 2 Ca Stearate | Same as No. 15 | 1 | 1 | MI |

TABLE – Continued

| Example No. | Components — Parts by Weight | | | | Remarks | Dusti-ness | Sticki-ness | Flow-ability |
|---|---|---|---|---|---|---|---|---|
| | PVC | Lead Stabilizer | Plasti-cizer | Lubri-cant | | | | |
| 17. | 15 | 80 | 5 DOP | None | Stabilizer added last | 1 | 5 | I |
| 18. | 15 | 80 | 5 DOP | 1 (2) | Same as No. 17 but added lubricant last | 1 | 4 | I |
| 19. | 15 | 80 | 5 DOP | 2 (2) | Same as No. 18 | 1 | 3 | I |
| 20. | None | 100% | None | None | — | 10 | 7 | U |

(1) DOP = dioctyl phthalate
(2) Commercial Wax-Acrawax C
(3) Commercial Product — Neo-fat 12
(4) Here stabilizer was basic lead carbonate
(5) Combination of commercial epoxy and polymeric plasticizers 50/50 mixture of Paraplex G-59 and G-52
(6) Mixed in a coffee blender
(7) Mixed in a ribbon blender

We claim:

1. An improved dustless, free-flowing lead stabilizing composition for incorporation into polyvinyl chloride comprising an intimate mixture of, by weight, 60 to 90% of a lead stabilizing compound, 5 to 35% of a polyvinyl chloride resin, 0.1 to 20% of a plasticizer, and 0.5 to 15% of a lubricant.

2. A composition as defined in claim 1 wherein said lead stabilizing compound is a basic lead salt of an inorganic acid.

3. A composition as defined in claim 1 wherein said lubricant is a higher fatty acid of about 8 to 22 carbon atoms or a salt thereof.

4. A composition as defined in claim 1 wherein the proportions of the ingredients are, by weight, 75 to 85% of lead stabilizing compound, 10 to 20% of polyvinyl chloride resin, 2 to 15% plasticizer, and 1 to 3% lubricant.

5. A composition as defined in claim 4 wherein the plasticizer is dioctyl phthalate, the lubricant is calcium stearate, and the lead stabilizing compound is a basic lead sulfate, phthalate, or carbonate.

6. A composition as defined in claim 1 wherein said lead stabilizing compound is a lead salt of phthalic acid.

* * * * *